United States Patent
Toksoz et al.

(10) Patent No.: US 10,187,486 B1
(45) Date of Patent: Jan. 22, 2019

(54) SYSTEMS AND METHODS FOR AUTOMATIC EXTENSION OF INFORMATION FROM A FIRST NETWORK TO A SECOND NETWORK

(71) Applicant: Google Inc., Mountain View, CA (US)

(72) Inventors: Tuna Toksoz, Mountain View, CA (US); Thomas Price, San Francisco, CA (US)

(73) Assignee: Google LLC, Mountain View, CA (US)

( * ) Notice: Subject to any disclaimer, the term of this patent is extended or adjusted under 35 U.S.C. 154(b) by 153 days.

(21) Appl. No.: 15/073,175

(22) Filed: Mar. 17, 2016

(51) Int. Cl.
- *G06F 15/16* (2006.01)
- *H04L 29/08* (2006.01)
- *H04L 29/06* (2006.01)

(52) U.S. Cl.
CPC .............. *H04L 67/26* (2013.01); *H04L 67/42* (2013.01)

(58) Field of Classification Search
CPC ................................ H04L 67/26; H04L 67/42
(Continued)

(56) References Cited

U.S. PATENT DOCUMENTS

| | | | | |
|---|---|---|---|---|
| 2014/0047078 | A1* | 2/2014 | Wilson | H04L 67/26 709/219 |
| 2014/0324972 | A1* | 10/2014 | Zhang | H04L 67/26 709/204 |
| 2017/0149913 | A1* | 5/2017 | Olomskiy | H04L 67/26 |

OTHER PUBLICATIONS

Accengage, Mobile Retargeting—Boost your performance with the latest mobile breakthrough, http://www.accengage.com/mobile-retargeting/ accessed on Feb. 22, 2016 (7 pages).

(Continued)

*Primary Examiner* — Bharat Barot
(74) *Attorney, Agent, or Firm* — Foley & Lardner LLP

(57) ABSTRACT

An implementation involves a push notification system receiving, from an application server, a request to serve to a client device a push notification, the request including push notification identity information. The implementation further involves the push notification system transmitting to the client device in response to the received request, a push notification. The implementation further comprises the push notification system receiving, from an operating system of the client device, information related to whether and how a user of the client device interacted with the push notification. The implementation further involves determining, by the push notification system, based at least in part on the information related to whether and how the user interacted with the push notification, whether to transmit a request to the message creation system to create and serve a targeted message. The implementation further involves the push notification system transmitting a targeted message create and serve request including information related to the content of the transmitted push notification responsive to said determination and targeted message identity information associated with the push notification identity information. The implementation further involves the message creation system creating, responsive to the create and serve request, a targeted message including content, at least some of the content of the targeted message based on the information related to the content of the transmitted push notification, the message targeted based on the targeted message identity information, and serving the targeted message based on the targeted message identity information.

19 Claims, 8 Drawing Sheets

(58) Field of Classification Search
USPC .................................................. 709/202–205
See application file for complete search history.

(56) References Cited

OTHER PUBLICATIONS

Chen, Patrick. Kahuna Introduces Conversion Campaigns to Increase Mobile Commerce and Conversion, Kahuna, Published Jun. 23, 2014. https://www.kahuna.com/blog/kahuna-introduces-conversion-campaigns-to-increase-mobile-commerce-and-conversion/ (4 pages).
Tye, Rob. "No Push? No Problem." RadiumOne Blog, Published Jun. 2, 2014, https://blog.radiumone.com/no-push-no-problem/ (2 pages).

\* cited by examiner

US 10,187,486 B1

SYSTEMS AND METHODS FOR AUTOMATIC EXTENSION OF INFORMATION FROM A FIRST NETWORK TO A SECOND NETWORK

BACKGROUND

Sharing information easily and consistently between networks can be useful for a variety of purposes, including compiling information on a subject of interest through a number of different data systems and performing analytics on the collected data. As the quantity of data grows and as data systems become more complex, it becomes more and more difficult to manually control and share access to data between networks.

SUMMARY

The present disclosure is directed to systems and methods for automatic extension of information between a first network and a second network. In one implementation, identity information comprising a push notification identifier and a targeted message identifier stored on an application (or "app") and/or an application server may be automatically extended to a push notification server, and may be further extended to a message creation system, as part of a process of serving a follow-up targeted message to a user of a client device after an attempt has been made to serve to the user a push notification. Furthermore, content information concerning the content of a push notification may be automatically extended from a push notification system to a message creation system. This allows for easy and automatic extension of information between networks.

A first implementation comprises receiving, by a push notification system from an application server, a request to serve to a user of an application executed on a client device a push notification, the request comprising push notification identity information. The implementation further comprises transmitting, by the push notification system to the identified client device in response to the received request, a push notification comprising content, and transmitting, by the push notification system to a message creation system, a targeted message creation request comprising information related to the content of the transmitted push notification and targeted message identity information associated with the push notification identity information. The implementation further comprises creating, by the message creation system responsive to the request, a targeted message comprising content, at least some of the content of the targeted message based on the information related to the content of the transmitted push notification, the message targeted based on the targeted message identity information.

A second implementation comprises a push notification system receiving, from an application server, a request to serve to a user of an application executed on a client device a push notification, the request comprising push notification identity information. The implementation further comprises the push notification system transmitting to the identified client device in response to the received request, a push notification comprising content. The implementation further comprises the push notification system receiving, from an operating system of the client device, information related to whether and how the user interacted with the push notification. The implementation further comprises determining, by the push notification system, based at least in part on the information related to whether and how the user interacted with the push notification, whether to transmit a request to the message creation system to create and serve a targeted message to the user. The implementation further comprises the push notification system transmitting a targeted message create and serve request comprising information related to the content of the transmitted push notification responsive to said determination and targeted message identity information associated with the push notification identity information. The implementation further comprises the message creation system creating, responsive to the create and serve request, a targeted message comprising content, at least some of the content of the targeted message based on the information related to the content of the transmitted push notification, the message targeted based on the targeted message identity information, and serving the targeted message to the user.

BRIEF DESCRIPTION OF THE DRAWINGS

Details of one or more implementations are set forth in the accompanying drawings and the description below. Other features, aspects, and advantages of the disclosure will become apparent from the description, the drawings, and the claims, in which:

Figure 1C:
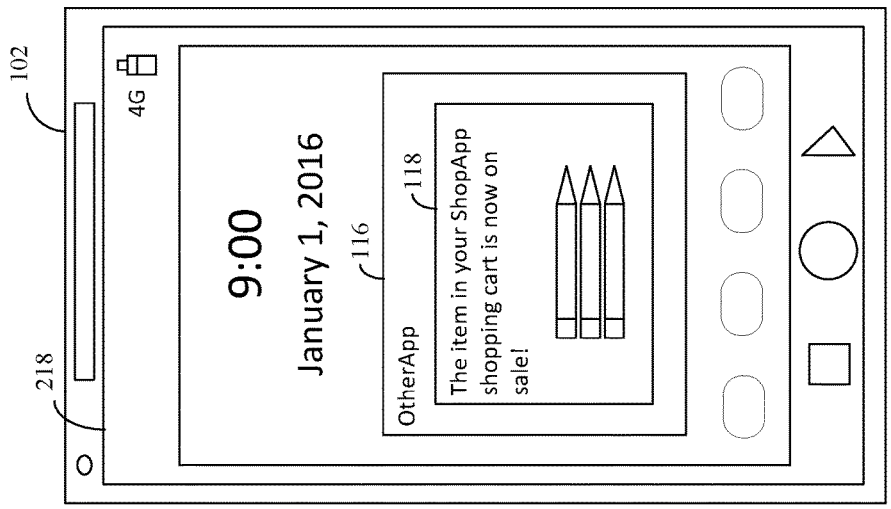
FIG. 1C is an illustration of a targeted message being displayed to a user of the client device as a follow-up to a push notification, according to one implementation.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Examples of specific implementations and applications are provided primarily for illustrative purposes.

The present technology allows for the automatic extension of information from a first network to a second network. In an implementation, push notification identity information and targeted message identity information stored on a client device and/or on an application server may be automatically extended to a push notification server, and may be further extended to a message creation system, as part of a process of serving a follow-up targeted message to a user of a client device after an attempt has been made to serve to the user a push notification. In an implementation, content information concerning the content of a push notification is automatically extended from a push notification system to a message creation system, as part of a process of serving a follow-up targeted message to a user of a client device after an attempt has been made to serve to the user a push notification.

A push notification is a message or notification intended for a user of a client device. Developers of applications can include code in their applications to push or display notifications to users. This may involve making a call to a push notification system, typically maintained by an operating system manufacturer, who may then push the messages to the individual apps. Code that the app developer has embedded in the app may then activate the message on the device. The content of a push notification may include, for example, text, an image, audio, video, a hyperlink, and/or any combination thereof.

A targeted message may be anything that may convey information to a target, e.g. a user of a client device. A targeted message may be in any format, for example, graphical, text, image, audio, video, etc. A targeted message may also be a combination (hybrid) of the formats. A targeted message may be banner targeted messages, interstitial targeted messages, pop-up targeted messages, rich media targeted messages, hybrid targeted messages, FLASH targeted messages, cross-domain iframe targeted messages, etc. A targeted message may also include embedded information such as hyperlinks, metadata, links, machine-executable instructions, annotations, etc.

A computing device, e.g., a client device, can receive a resource, such as a webpage, a document, an application, an advertisement, etc. In some implementations, the computing device may access the resource via the Internet by communicating with a server, such as a webpage server, corresponding to that resource. The resource may include content from a first-party content provider and may also include additional third-party content, such as a targeted message or other content. For example, responsive to receiving a request to access a webpage, a webpage server and/or a client device can communicate with a data processing system, such as a targeted message delivery system, to request a targeted message to be presented with the requested webpage, such as through the execution of code of the resource to request a third-party targeted message to be presented with the resource. The targeted message delivery system can select a third-party targeted message and provide data to effect presentation of the targeted message with the requested webpage on a display of the client device. In some instances, the targeted message is selected and served with a resource associated with a search query response. For example, a search engine may return search results on a search results webpage and may include third-party targeted message related to the search query in one or more targeted message slots of the search results webpage.

The computing device (e.g., a client device) may also be used to view or execute an application, such as a mobile application. The application may include first-party content that is the subject of the application from a first-party content provider and may also include additional third-party provided targeted message or other content. For example, responsive to use of the application, a resource server and/or a client device can communicate with a data processing system, such as a targeted message delivery system, to request a targeted message to be presented with a user interface of the application and/or otherwise. The targeted message selection system can select a third-party targeted message and provide data to effect presentation of the targeted message with the application on a display of the client device.

In some instances, a targeted message identifier may be associated with an app, with a device, or with an app/device combination. Generally, targeted message identifiers are associated with a device and are not app-specific, but they need not be. The targeted message identifier may be a randomized number associated with the device to identify the device during subsequent requests to serve targeted messages.

In some instances, a push notification identifier may be associated with an app installed on a device. The push notification identifier may be a randomized number associated with the app to identify the app during subsequent requests to serve push notifications. This push notification identifier may be the same identifier as the targeted message identifier, but is generally not. For example, a push notification identifier may be a token specific to an installation of an app on a particular device, assigned by a push notification system.

Figure 1B:
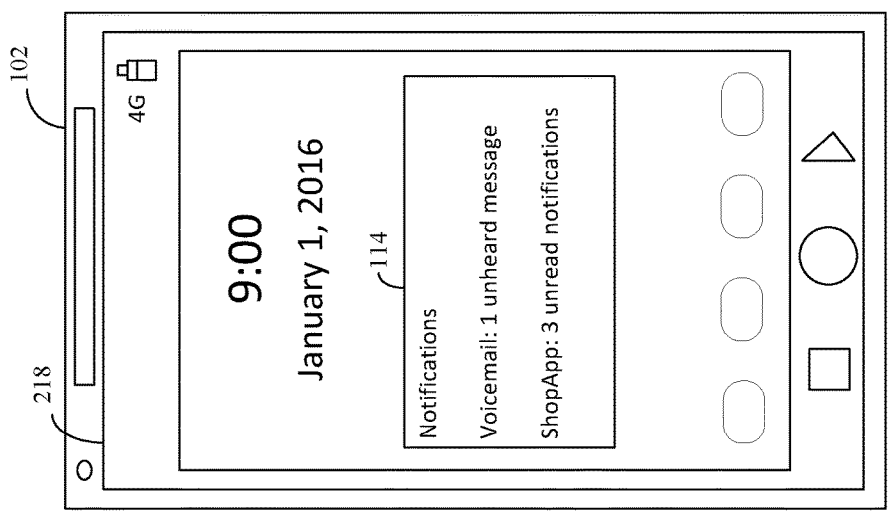
FIG. 1B is an illustration of a push notifications having been displayed to a user of a client device but not having been acted upon by the user, according to one implementation.
Figure 1A:
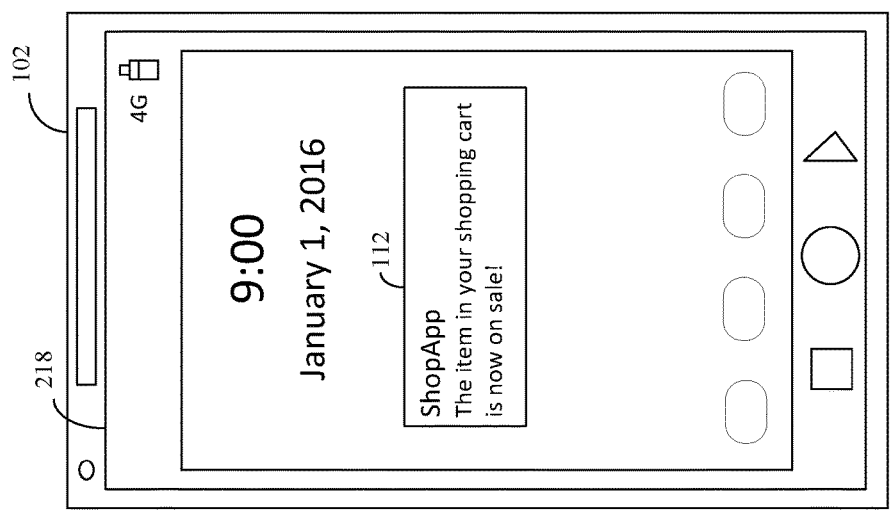
FIG. 1A is an illustration of a push notification being displayed to a user of a client device, according to one implementation.

Referring to FIG. 1A through 1C in a brief overview, these figures depict a user experience of receiving a push notification and a follow-up targeted message on a user device. FIG. 1A depicts an example of a push notification being displayed on a client device, FIG. 1B depicts an example of a push notification having been received by a client device 102 but not having been acted upon by a user of the client device, and FIG. 1C depicts an example of a follow-up targeted message being displayed to a user.

FIG. 1A depicts an example of a push notification displayed on a client device. As discussed above, push notifications may be displayed by client devices to a user. Push notifications may be displayed to a user in a notification list, in a pop-up message frame on a desktop, on the homescreen of a mobile device, over a lock-screen display, or in any manner described in this application, or in any other manner. In FIG. 1A, a push notification 112, requested by an app called "ShopApp," is displayed on a display 218 of a client device 102 on a homescreen of the client device. A push notification need not comprise only text content as depicted in FIG. 1A, and may additionally or alternatively comprise video content, audio content, hyperlinks, clickable or touch content that when clicked or touched instantiates a computer process, or any other kind of content.

FIG. 1B depicts an example of a push notification having been received by a client device 102 but not having been acted upon by a user of the client device. In FIG. 1B, a push notification in notification list 114 is displayed to the user of the client device indicating that there are three unread push notifications from an app called ShopApp. In this example, two previous push notifications are presumed to have been sent to the client device, one for each time a new notification was generated by ShopApp, and those two notifications are presumed to have gone unread. Although here a summary of push notification activity is displayed to a user in a notification list, as described above, individual push notifications or summaries of push notification activity may be displayed to a user in other ways. In this depiction, three push notifications were requested by ShopApp, and a summary was displayed by the operating system informing a user that 3 notifications are sitting unread in the notification tray. As discussed above, a push notification may additionally or alternatively comprise other content. It is possible that the push notification depicted here may be acted on by a user, but not in a manner desired by a party who instructed the app to request a push notification, thus leading the party to send a follow-up targeted message to the user. For example, a user may have read the push notification depicted in FIG. 1B and acted on that by e.g. telling a friend about it, but may not have opened ShopApp to check his or her pending in-app notifications, even though a developer of ShopApp may have desired that the user do so upon receiving the push notification. A user may also fail to act as the party desires in any other manner. In such a scenario, it may be beneficial to the party that requested the push notification, e.g. the app developer, to follow-up on the push notification by having a targeted message shown to the user. Since users may not read push notifications promptly or since push notifications may be limited in the type of content they can convey or since reinforcement of a message through multiple presentations can improve the likelihood of a user taking action, it may additionally or alternatively beneficial to show a targeted message to a user as a reinforcement regardless of the status of the push notification e.g. regardless of whether the push notification was seen or not or was acted upon or not. The present technology involves a method for automatic extension of information from a first network to a second network that may facilitate such a follow-up or such reinforcement.

FIG. 1C depicts an example of a targeted message being displayed to a user. In an implementation of a method for automatic extension of information from a first network to a second network, targeted message 118 is displayed to a user in an app window 116 on client device 102. A targeted message may be displayed to a user in any manner, e.g. any manner described above. In the implementation depicted here, the app window is executed by OtherApp, and the targeted message is a follow-up targeted message served to a user after the user failed to act on the push notification depicted in FIG. 1A. In this implementation, the content of the targeted message can be similar to the content of the push notification on which the user failed to act. Such a follow-up targeted message may be used, for example, by an app developer to re-display content to a user. For example, if a user of a shopping app did not act on a push notification informing the user of a price reduction on an item in the user's in-app shopping cart by purchasing said item, a follow-up targeted message reminding the user of the price reduction may be sent. Such a targeted message may additionally or alternatively be used, for example, by an app developer to display new content to a user. For example, if an attempt was made to send a push notification to a user of a client device, but the push notification was not displayed to the user because, e.g., the client device was turned off when the push notification was to be received by the client device, or because, e.g., the user had disabled the reception of push notifications from that app, or on the client device generally, or both, or for any other reason, then a follow-up targeted message might be served to the user to show new content, or content similar or identical to the content of the push notification that was never displayed to the user, or any content.

Figure 2:
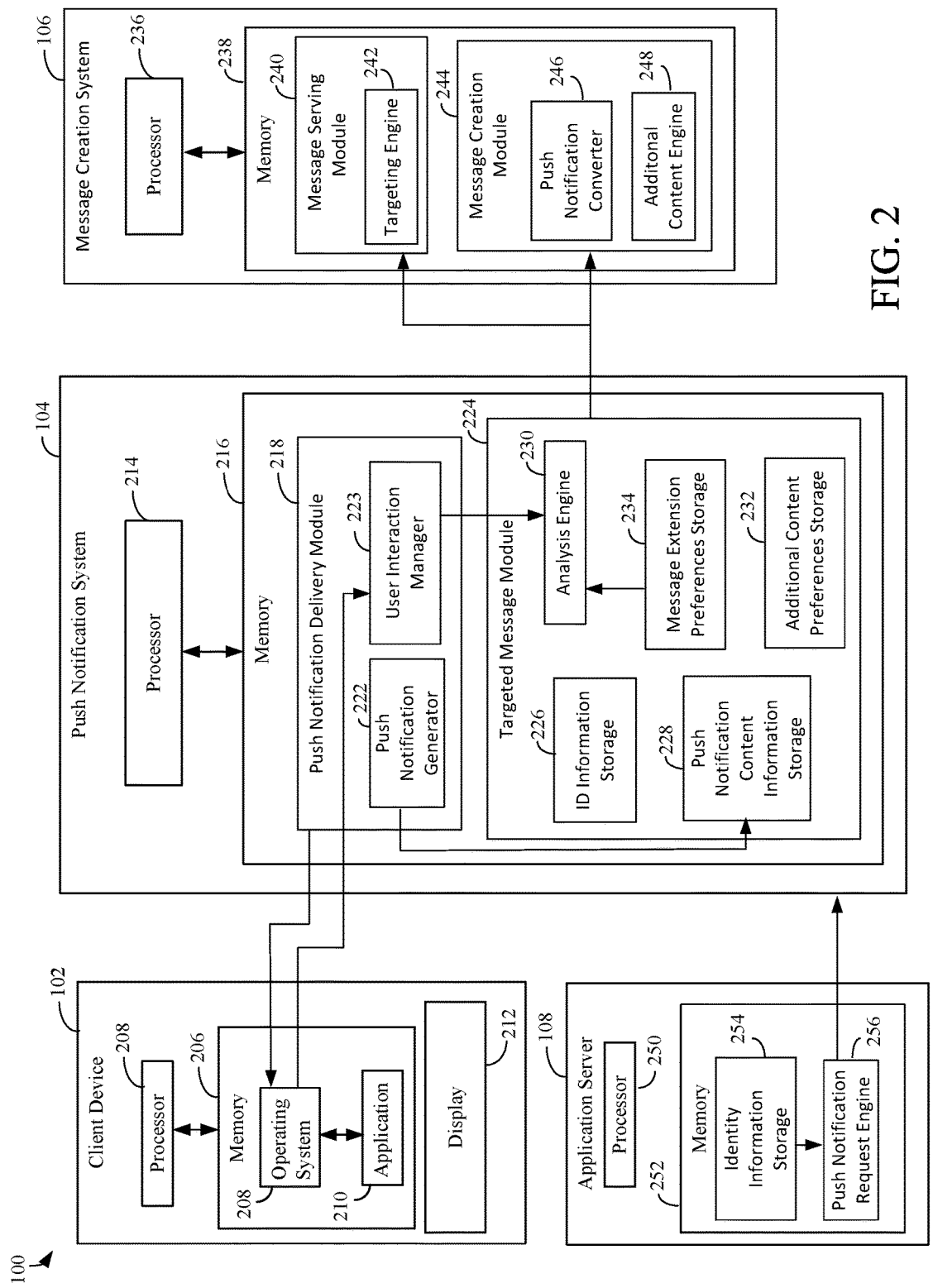
FIG. 2 is a block diagram illustrating a detailed view of components and interactions between those components in an implementation.

FIG. 2 shows some of the components and devices that can be used in a system 100 that can be used in an implementation of a method for automatic extension of information from a first network to a second network. The arrows depict some examples of transmission of information that occurs in an implementation of a method for automatic extension of information from a first network to a second network.

In one implementation, a system 100 can include a network (not shown in FIG. 2). The network may include a local area network (LAN), wide area network (WAN), a telephone network, such as the Public Switched Telephone Network (PSTN), a wireless link, an intranet, the Internet, or combinations thereof.

In implementation, the system 100 can include a client device 102. The network may be accessible to the client device, e.g. through a network interface. The client device 102 can include one or more devices such as a computer, laptop, desktop, smart phone, tablet, personal digital assistant, set-top box for a television set, a smart television, or server device configured to communicate with other devices via the network. The device may be any form of portable electronic device that includes a data processor 208 and memory 206. The memory 206 may store machine instructions that, when executed by the processor 208, cause the processor 208 to perform one or more of the operations described herein. The memory 206 may also store data to effect presentation of one or more resources, content items, etc. on the computing device. The processor 200 may include a microprocessor, an application-specific integrated circuit (ASIC), a field-programmable gate array (FPGA), etc., or combinations thereof. The memory 206 may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The client device 102 can execute a software application 210 (e.g., a shopping application, a game application, or other application) to retrieve content from other computing devices over the network. It may, for example, retrieve content from an application server 108 for display to a user, or from any other computing device. It may additionally or alternatively retrieve content stored in memory 206. In an implementation, the application is run on an operating system 208. The operating system may be, for example, an iOS operating system, an Android operating system, a Windows phone operating system, a Windows operating system, or any other operating system, either for mobile devices or for any other device. The operating system may be able to access a push notification system 104, described below, through a network interface, through a LAN connection, an intranet connection, an internet connection, a WiFi connection, or through any other kind of connection.

In one implementation, the system 100 can include at least one server, such as application server 108. The application server 108 can include at least one logic device, such as a computing device having a data processor, to communicate via the network, for example with a client device 102, and/or an application 210 on the client device. The server 104 can include one or more data processors 250, configured to execute instructions stored in a memory device 252 to perform one or more operations. In other words, the one or more data processors and the memory device of the application server 108 may form a processing module. The processor 220 may be similar to processor 208, and may include a microprocessor, an application-specific integrated circuit (ASIC), a field-programmable gate array (FPGA), etc., or combinations thereof. The memory 220 may be similar to memory 206, and may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The application server 108 may also include an interface configured to receive data via the network and to provide data from the server 108 to any of the other devices on the network.

In an implementation, application server 108 is maintained by a party such as an application developer or an application manager to provide general services useful to servicing instances of an application installed on various devices. For example, an application manager may provide updates to applications installed on various devices through a network connection to the application server. An application server may also compile data collected by applications installed on various devices, and may perform analytics on said data, or may perform other services, tasks or operations. In an implementation, a push notification request engine of application server 108, which may comprise an application, service, routine, daemon, or other executable logic for transmitting a request to a push notification system, transmits a request to a push notification system 104 to serve to a user of an application 210 executed on a client device 102 a push notification. The request may be transmitted via any appropriate method, such as an HTTP GET request, a remote procedure call, or any other such method. In some implementations, transmitting the request may comprise opening a transport layer connection to the server.

In an implementation, application server 108 stores identity information in an identity information storage 254 comprising push notification identity information such as, for example, a push notification device token. The identity information may, but need not, further comprise targeted message identity information associated with the push notification identity information such as, for example, an advertising ID that identifies the same client device and/or app as the push notification identity information. In other implementations, the targeted message identity information is not stored on the application server, as discussed below in reference to FIGS. 5 and 6. The above-mentioned request to serve a push notification to a user may comprise this identity information. In this way, the push notification system may obtain access to identity information as part of a method of automatically extending information from a first network to a second network. The request may also comprise message extension preferences, described in detail below in reference to interaction analysis engine 230.

In an implementation, the system 100 may comprise a push notification system 104. A push notification system may be a server, or a device, or any other computing system that includes a processor 214 and memory 216 and can generate and transmit push notifications. In an implementation, the push notification system 104 comprises a push notification delivery module 218 and a targeted message module 224. Push notification delivery module 218 may comprise an application, service, daemon, routine, or other executable logic for generating a push notification and transmitting the push notification to e.g. a device or server via e.g. a network connection. In an implementation, push notification delivery module 218 generates a push notification in response to a request received from application server 108, and transmits the push notification to a client device 102. The request may comprise identity information that identifies the client device to be served. In one implementation, the request may include a device token identifying a particular application on a particular client device, and the push notification service may transmit the push notification to the device so identified.

In one implementation, the push notification is created by a push notification generator 222 of push notification system 104. A push notification generator may comprise an application, service, daemon, routine, or other executable logic that generates a push notification. In an implementation, the push notification generated includes content based on a push notification request received from an application server 108. For example, one method of generating such a push notification involves a party such as, e.g., an app developer via e.g. an application server, using e.g. a user interface of a push notification request engine associated with a push notification system to input text desired to be included in a push notification. The party may additionally or alternatively input any other content. The push notification request engine may then transmit the request, which can include a token specifying a device, over a network to a push notification generator of a push notification system. The push notification generator may then create a push notification that includes e.g. the inputted text. For example, an app developer may use a user interface to have an application server request that a textual push notification be served to a user of a client device that has an app installed that reads "The item in your shopping cart is now on sale!" The request may then be transmitted via a network to a push notification generator of a push notification system, which generates a push notification that corresponds to the inputted text. The push notification code may then be transmitted via a network to a client device. An operating system of the client device may then notify the app that there is a push notification for it to deliver. The app may then request, responsive to this notification, that the operating system deliver it. For example, the app may have embedded code configured to automatically respond to any push notification that's ready to be delivered by calling a method e.g. showPushMessage ("YOUR_MESSAGE_HERE"). The operating system may then deliver the push notification in the notification tray. The operating system may also add a possible alert such as a popup or banner on e.g. the homescreen or lockscreen, possibly depending on how the user has configured alerts on the device. Other types of push notification may also be involved in this process, e.g. audio, graphical, hyperlinks, or other push notifications.

The push notification may, in an implementation, be delivered to an operating system 208 of a client device 102 via a network connection, LAN connection, internet connection, intranet connection, or any other type of connection. The operating system 208 is preferably integrated with the push notification system in that, e.g., it comprises software development kits that facilitate such a connection. However, the operating system need not be so integrated so long as there is some way for it to have a network connection, either direct or indirect, to the push notification service.

In an implementation, a request for a push notification by an application server 108 may comprise identity information as described above. For example, this identity information may include one or a plurality of push notification identifiers such as, for example, device tokens. The identity information may also include targeted message identifiers, such as, for example, advertising IDs associated with those device tokens, described in more detail below in reference to FIGS. 5-6. This identity information may identify a particular client device, or a particular app on a client device, or both, for the push notification system to target for transmission of the push notification. The determination of which devices and/or apps to request that a push notification be sent to may be made, for example, by a party managing the application server. For example, an app developer may select via e.g. a user interface or via a preset algorithm, or in any other fashion, identity information corresponding to a plurality of client devices that the app developer wishes to transmit a push notification to. This identity information may be selected by the party managing the application server directly, or via an algorithm, or via any other method. In an implementation, the identity information may, be selected based on analytics performed on data stored on e.g. the application server or elsewhere, concerning the user to whom the push notification is to be displayed. For example, the identity data may be selected based on e.g. the intended client device push notification recipient's geographic location. For example, an app developer of a restaurant review app may wish to send a push notification to any user of the app when that user's client device is within a mile of a restaurant that the user has positively reviewed, to remind the user that the favored restaurant is close by. The app developer may have a preset algorithm that determines whether this triggering event occurs and executes code that generates a push notification request that comprises the identity information of the client device. The identity information may additionally or alternatively be selected in any other manner. In an implementation, the push notification system may use this identity information, included in the push notification request, or otherwise transmitted to the push notification system, to determine which client device to transmit a requested push notification to.

In an implementation of a method of automatically extending information from a first network to a second network, a push notification system 104 may transmit a targeted message creation request to a message creation system 106 via a network. The request may be transmitted via any appropriate method, such as an HTTP GET request, a remote procedure call, or any other such method. In some implementations, transmitting the request may comprise opening a transport layer connection to the server. The targeted message creation request may comprise identity information, and may include push notification identity information and/or targeted message identity information, and may include content information related to the content of a push notification. In one implementation, a targeted message creation request is used to generate a follow-up targeted message for a push notification, such as the follow-up targeted message described above. The targeted message creation request may be transmitted prior to the transmission of the push notification, at the same time as the transmission of the push notification, or after the transmission of the push notification.

In an implementation, a targeted message creation request is generated by a targeted message module 224 of the push notification system. The targeted message module 224 may comprise an application, service, daemon, routine, or other executable logic creating a targeted message creation request. A targeted message creation request may be, for example, computer code executable by e.g. an operating system, an application programming interface, or any processor, that generates a targeted message. A targeted message may comprise any information to be served to a target. The target may be a client device, an application, a user, a publically viewable display, a webpage, or any other possible recipient of the information. Said information may comprise any graphical, textual, audio, video, hyperlink or other information. The targeted message may be in any format, including, for example, graphical, text, image, audio, video, etc. The targeted message may also be a combination (hybrid) of the formats. The targeted message may be banner content items, search results, interstitial content items, pop-up content items, rich media content items, hybrid content items, FLASH content items, cross-domain iframe content items, etc. The content items may also include embedded information such as hyperlinks, metadata, links, machine-executable instructions, annotations, etc.

In an implementation, the targeted message module 224 of the push notification system may include an identity information storage 226 that stores identity information. The identity information may include push notification identity information and/or targeted message identity information, or any other identity information. The push notification identity information may be associated with a push notification that was delivered, is being delivered, or will be delivered by a push notification delivery module 218. The targeted message module 224 of the push notification system may also include a push notification content information storage 228. This may store push notification content information related to the content of the push notification. For example, if the push notification was a text notification reading "The item in your shopping cart is now on sale!", this text may be stored in the push notification content information storage 228. Additionally or alternatively, if the push notification contained, for example, an image, the image may be so stored. Additionally or alternatively, if the push notification contained, for example, a hyperlink, the URL of the hyperlink destination may be stored. The push notification content information may be stored in any appropriate format, e.g. a .txt file or a .jpeg file. In an implementation, the notification content information is obtained from the push notification generator 222 after generation of the push notification.

In an implementation, the targeted message module 224 of the push notification system may include an additional content preferences storage 232. This storage may include additional content preferences comprising additional content to be incorporated in a targeted message, for example, incorporated in a follow-up message to a push notification. Additional content may, but need not, be included in a targeted message. Additional content preferences may be transmitted to the push notification system 104 via a network from, for example, an application server 108 as part of a push notification request, or separately loaded into a user interface or may be transmitted to the push notification system or written into the push notification system memory in any other manner, or may be selected from a set of predetermined preferences stored on the push notification system. This may be helpful, e.g., in facilitating extension of this information to a message creation system. The additional content preferences may include additional content that was not included in the push notification. For example, the additional content may include an image, a video, new text, a hyperlink, or any other additional content. This content may be incorporated in a targeted message by, e.g. a message creation module 244 of a message creation system 106. The additional content preferences may include instructions or preferences involving how the additional content is to be incorporated in the targeted message. For example, in a preferred implementation, an app developer may load one or more supplemental images to the push notification system 104 via a user interface to be used in targeted messages corresponding to the push notification, the targeted messages being generated by e.g. any of the methods described in this application.

In one implementation, the incorporation may involve adding the additional content to a targeted message that comprises content related to the content of the push notification. For example, the targeted message may be a follow-up to a text push notification, comprising an image displayed above some text, the text being the same as the text of the push notification, the image being additional content. The incorporation of additional content may be done in any appropriate way, for example, by adding additional audio to a text or image, by incorporating text from a push notification into a new video, by adding new text to text from a push notification, by changing the font or color or style of text from push notification, or in any other manner. The additional content preferences may include instructions or preferences as to when and how the additional content should be incorporated. For example, if a text push notification is not displayed to a user of a client device because the user has push notifications disabled on their device, the preferences may indicate that no additional content should be added and that the targeted message should simply incorporate the same text that was included in the push notification. If, however, the text push notification was displayed to a user of a client device, but the user failed to perform a desired follow up action such as, e.g., purchasing an item, then the additional content preferences may indicate that the follow-up targeted message should incorporate an additional image. This may allow a party to escalate the content of the information being displayed to a user of a client device as required to achieve a desired result.

In one implementation of a method for automatic extension of information from a first network to a second network, a push notification request is received by a push notification system 104, the push notification system transmits a push notification to a client device 102, and further transmits a message creation request to a message creation system 106. At this point, an operating system 208 of the client device may send reports to the push notification system about whether and how a user of the client device interacted with the push notification. These user interaction reports may be managed by a user interaction manager 223, which may comprise an application, service, routine, daemon, or other executable logic for managing user interaction reports. The reports may be requested by the user interaction manager 223, or the operating system may simply generate and transmit the reports, via a network, to the push notification system, based on a triggering event, or at predetermined intervals, or by any other method. The reported user interactions may include information pertaining to whether the user had disabled push notifications, either for a particular app or for the device in general, whether and when the client device was turned on or off, whether the push notification was displayed to a user, whether the user clicked the push notification, whether the user performed some subsequent action after having the push notification displayed to him or her, e.g. purchased an item or performed any other subsequent action, whether the user performed some subsequent action after not having had the push notification displayed to him or her, or any other information pertaining to whether and how a user interacted with the push notification. Whether and how a user interacts with a push notification may also include non-interaction or non-action by a user. For example, whether and how a user interacts with a push notification may include whether the push notification was not displayed to a user, whether a user did not perform a subsequent action after the push notification was displayed to a user, or any other user interaction or non-interaction.

In one implementation, the user interaction engine 223 may receive the user interaction reports and transmit or copy one or a plurality of them to an interaction analysis engine 230 of a targeted message module 224, or the user interaction engine 223 may be integrated with the interaction analysis engine, or may share or access the user interactions reports from a location also accessible, directly or indirectly, by the interaction analysis engine 230. The interaction analysis engine may also access message extension preferences, which may be stored in message extension preferences storage 232. Message extension preferences may be instructions, rules, algorithms, or any combination thereof, or information relating to determining whether to transmit a request to create a targeted message, for example, as a follow-up to a push notification. For example, message extension preferences may include a rule that states that a request to create a targeted message should not be sent if a push notification is displayed to a user of a client device, but should be sent if a push notification was not displayed to a user because, e.g., the client device was turned off. Message extension preferences may involve bidding algorithms for paid targeted messages, budgets, frequency caps to determine a maximum number of times a message should be displayed to a user, cost per click, and/or other standard considerations. One advantage of implementations of the present technology is that by extending information from a first network to a second network, push notifications may be treated as targeted messages for purposes better implementing a comprehensive messaging strategy. For example, this may allow a comprehensive messaging strategy that includes a frequency cap of X in terms of all messages sent such that push notifications and targeted messages may both count towards the frequency cap. In an implementation, message extension preferences are transmitted to the push notification system 104 from an application server 108 as part of a request for a push notification, having been selected or inputted into the application server 108 by a manager of the application server, e.g. an app developer, via e.g. a user interface. In an implementation, message extension preferences may be loaded by e.g. an app developer to a push notification system or to a message creation system via e.g. a user interface.

In an implementation, the interaction analysis engine 230 determines whether to transmit to a message creation system 106 a request to serve a targeted message to a user of a client device. This determination may be based in part on the user interaction reports and the message extension preferences. Two examples of this determination process are shown in FIGS. 3 and 4, described in detail below.

In an implementation, the system 100 includes a message creation system 106. A message creation system may be a server, or a device, or any other computing system that includes a processor 236 and memory 238 and can create, provide or distribute, directly or indirectly, targeted messages. For example, a message creation system might include an advertising network. A message creation system may comprise a number of systems at least some of which operate independently, including, e.g. a message generator system, a message distribution system, and/or a message providing system.

In an implementation, a message creation system 106 includes a message creation module 244. Message creation module 244 may comprise an application, service, routine, daemon, or other executable logic for creating a message. A message creation module 244 may include a push notification converter 246 and an additional content engine 248. In an implementation, a push notification converter may, for example, be part of an operating system or may be a routine that uses an application programming interface (API) of an operating system, or may be a program executable on the message creation system that processes a push notification message and converts it in to a targeted message. In one implementation, the conversion may simply involve taking the text of a text push notification and creating a textual targeted message comprising said text, in a format suitable for a targeted message. For example, e.g. the textual targeted message may be formatted for display in a targeted message slot in a listing of search results, or may be formatted for display in a banner, or may be formatted in any other manner appropriate for a targeted message.

In an implementation, the conversion may additionally or alternatively involve adding additional content to a targeted message that comprises content related to the content of the push notification by an additional content engine 248. An additional content engine 248 may be part of an operating system or may be a routine that uses an application programming interface (API) of an operating system, or may be a program executable on the message creation system that incorporates additional content in to a targeted message. For example, the targeted message may be a follow-up to a text push notification, comprising an image displayed above some text, the text being the same as the text of the push notification, the image being additional content. The incorporation of additional content may be done in any appropriate way, for example, by adding additional audio to a text or image, by incorporating text from a push notification into a new video, by adding new text to text from a push notification, by changing the font or color or style of text from push notification, or in any other manner.

In an implementation, a message creation system 106 receives a request from a push notification system 104 to create a targeted message, as described above. The message creation system may create a message in the manner described above and may store it, pending a request from the push notification system to either delete the message or to serve the message to a user of a client device 102. Alternatively, a message creation system 106 may receive a request from a push notification system 104 to create and immediately serve a targeted message to a user of a client device 102.

In an implementation, the message creation system 106 includes a message serving module 240. The message serving module 240 may comprise an application, service, routine, daemon, or other executable logic for serving a targeted message to a user of a client device. In an implementation, the message creation system receives a request to serve a previously created targeted message to a user of a client device from a push notification system 104. This request may comprise identity information, and may include a targeted message identifier such as, e.g., an advertising identifier that may, e.g., be associated with a push notification identifier that identifies the recipient of a previously served push notification. A targeting engine 242 of a message serving module 240 may execute a process that serves the targeted message to a user of a client device on which an application identified by the advertising identifier is installed. In this way, the identity information has been automatically extended from a push notification system to a message creation system such that a targeted message may be served to a user that was, e.g., previously served with a push notification.

Figure 3A:
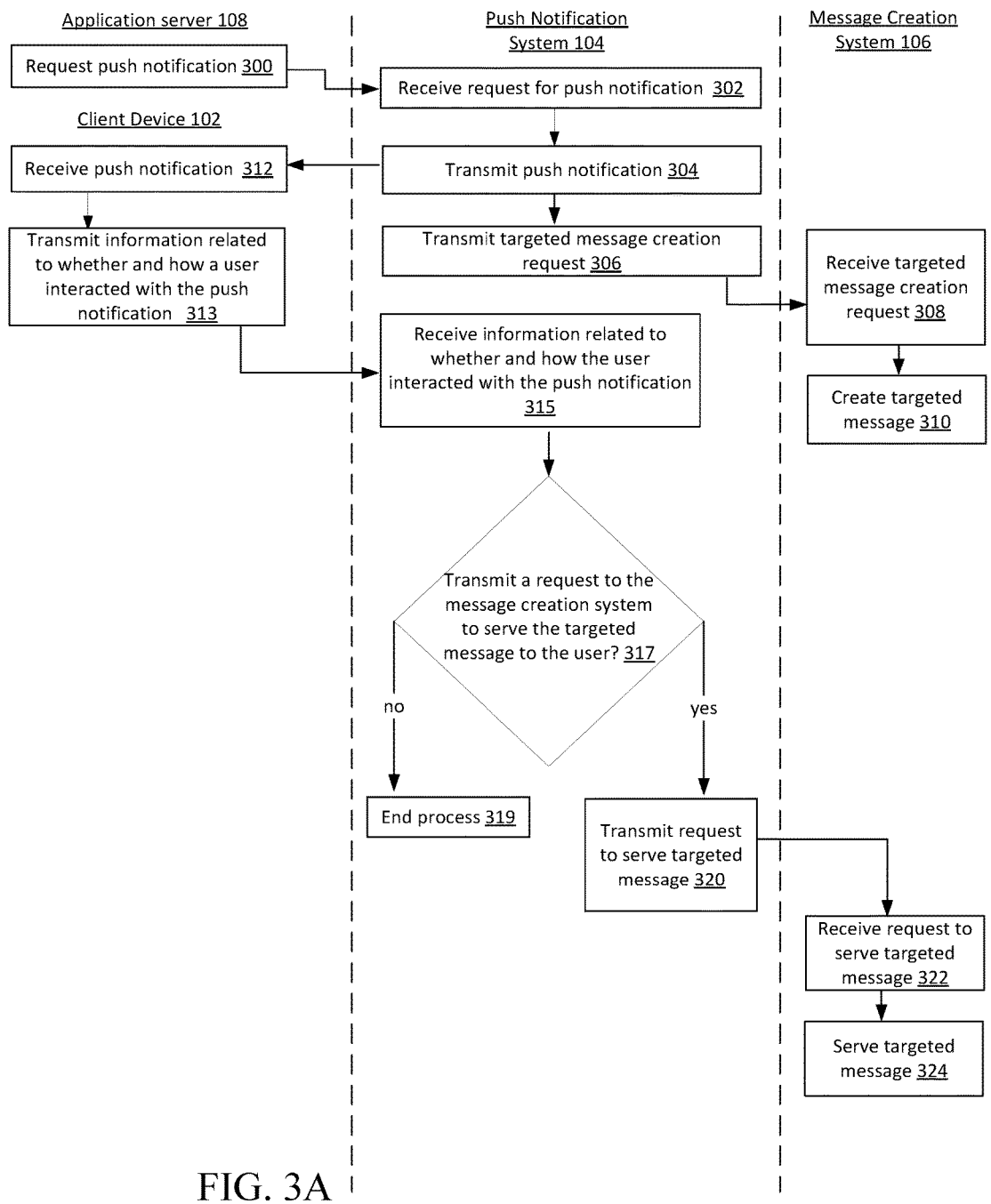
FIG. 3A depicts a general overview of one implementation in which a targeted message is created pre-emptively, before it is certain whether it will be served to a user.
Figure 3B:
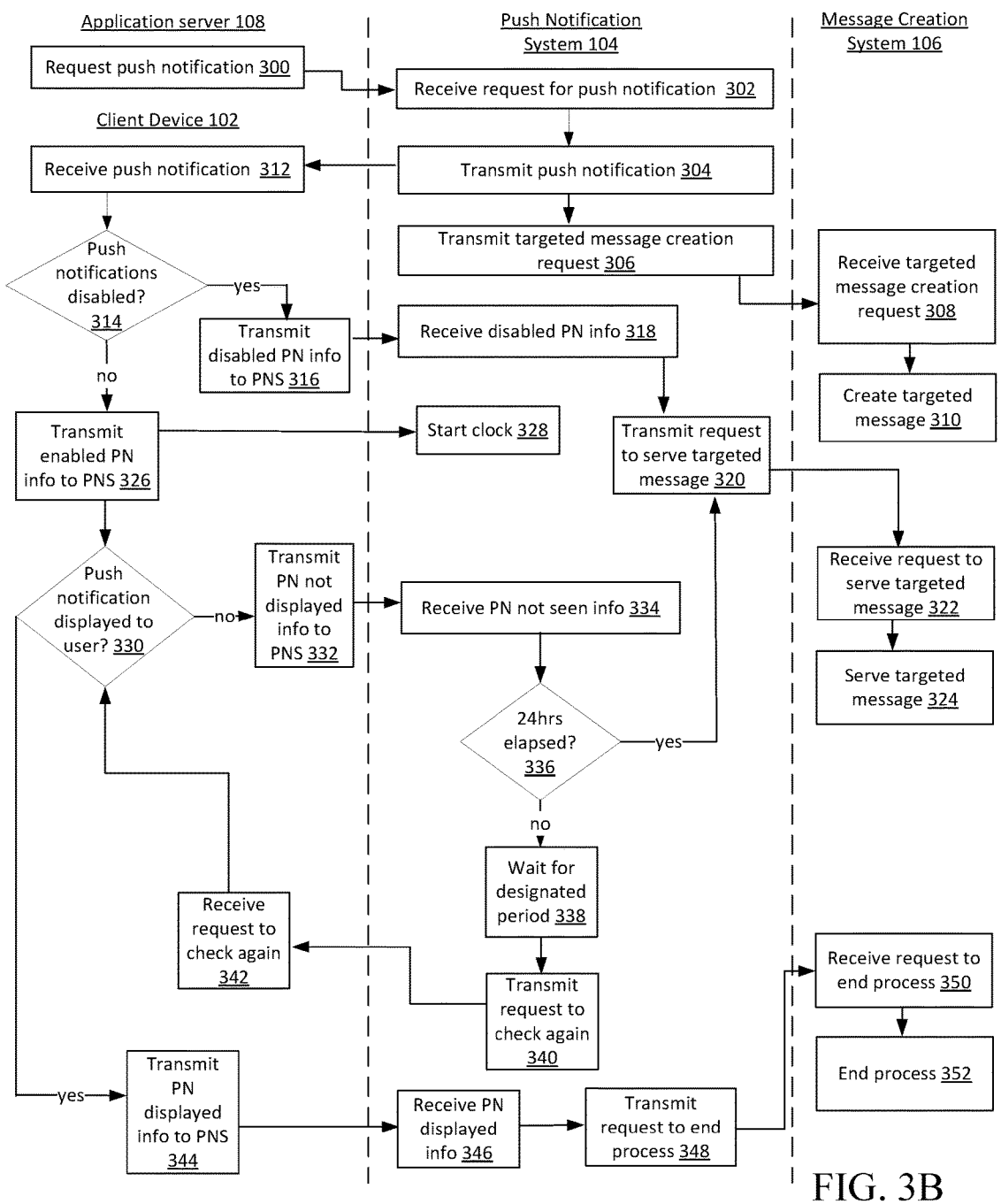
FIG. 3B is a flow chart illustrating a method for automatic extension of information from a first network to a second network involving preemptive message creation, according to one implementation.

FIGS. 3A and 3B show an implementation of a method for automatic extension of information from a first network to a second network, similar to the one described above. FIG. 3A depicts a general overview of one implementation in which a targeted message is created pre-emptively (before it is certain whether it will be served to a user). FIG. 3B depicts a more specific implementation of such a method, and goes in to more detail.

Referring to FIG. 3A, in one implementation, at step 300, an application server 108 requests a push notification. The request may be transmitted via any appropriate method, such as an HTTP GET request, a remote procedure call, or any other such method. In some implementations, transmitting the request may comprise opening a transport layer connection to the server. The request may comprise identity information, message extension preferences, and/or additional content preferences as described above.

In an implementation, the push notification system 104 may receive the request for a push notification at step 302. The push notification generator 222 may then generate a push notification responsive to the request in the manner described above. Information related to the content of the push notification may be stored in push notification content storage 228.

In an implementation, the push notification system 104 may transmit the push notification to the client device 102 at step 304. The client device may have been identified by the identity information that was included in the push notification request, for example, by a device token. The push notification can be transmitted to the operating system of the client device in the manner described above, or in any other manner.

In an implementation, at step 306 the push notification system transmits a targeted message creation request to a message creation system 106, as described above. This request may comprise identity information including, e.g., an advertising identifier.

In an implementation, at step 308 the message creation system 106 may receive the targeted message creation request. At step 310, the message creation system 106 may create a targeted message as described above. At this point, the message creation system 106 may store the targeted message in memory pending a request to serve the targeted message to a user of client device 102. In other implementations, including an implementation described below pertaining to FIGS. 4A and 4B, the targeted message may be served to a user of client device 102 immediately.

In an implementation, the client device 102 may receive the push notification at step 312. The term "receives the push notification" can include the scenario where the client device receives the transmission described in step 304 but where push notifications are disabled for the client device. Additionally or alternatively, push notifications may be disabled for the application 210 associated with the application server 108 that requested the push notification at step 300. The term "receives the push notification" can also include the scenario where the client device is turned off and the push notification transmission is queued on the push notification system for transmission.

In an implementation, at step 313 the client device 102 may transmit information related to whether and how a user interacted with the push notification. As discussed above, this information may be managed by a user interaction manager 223, which may comprise an application, service, routine, daemon, or other executable logic for managing user interaction reports. The information may be requested by the user interaction manager 223, or the operating system may simply generate and transmit the reports, via a network, to the push notification system, based on a triggering event, or at predetermined intervals, or by any other method. The reported user interactions may include information pertaining to whether the user had disabled push notifications, either for a particular app or for the device in general, whether the client device was turned on or off and when, whether the push notification was displayed to a user, whether the user clicked the push notification, whether the user performed some subsequent action after having the push notification displayed to him or her, e.g. purchased an item or performed any other subsequent action, whether the user performed some subsequent action after not having had the push notification displayed to him or her, or any other information pertaining to whether and how a user interacted with the push notification. Whether and how a user interacts with a push notification may also include non-interaction or non-action by a user. For example, whether and how a user interacts with a push notification may include whether the push notification was not displayed to a user, whether a user did not perform a subsequent action after the push notification was displayed to a user, or any other user interaction or non-interaction.

In an implementation, at step 315 the push notification system 104 receives the information related to whether and how the user interacted with the push notification. This may be processed by, e.g., a user interaction manager 223 of a push notification delivery module 218 as discussed above.

In an implementation, at step 317 the push notification system 104 may determine whether to transmit a request to the message creation system to serve the targeted message to the user. This determination is based at least in part on the information related to whether and how the user interacted with the push notification. For example, if it can be gleaned from the information that the user did not have the push notification displayed to them (e.g. because the client device was turned off), the push notification system may determine to transmit the request to serve the targeted message to the user. This determination may be made in any other appropriate manner, such as, e.g., any of the manners discussed above, or e.g. the manner depicted in FIG. 3B, discussed below.

In an implementation, if the push notification determines not to transmit a request to serve the targeted message to the user at step 317, the push notification system may revisit that determination at a later time, possibly when more information is available to it, or it may determine to proceed to step 319 and end the process. For example, if a predetermined amount of time has elapsed since the push notification was transmitted, the push notification system may determine to end the process rather than wait for more information. These determinations may be made in any appropriate manner, such as e.g. those described above or e.g. the manner depicted in FIG. 3B, discussed below.

In an implementation, if the push notification determines to transmit a request to serve the targeted message to the user at step 317, proceed to step 320 where the push notification system may transmit a request to serve the targeted message to the user. At step 322, the message creation system 106 may receive this request, and at step 324 the message creation system may serve the targeted message to the user. These steps may be performed in any appropriate manner, such as e.g. those described above or e.g. the manner depicted in FIG. 3B, discussed below.

FIG. 3B depicts a detailed implementation of a method by which information is automatically extended from a first network to a second network. In one such implementation, an application server 108 requests a push notification at step 300. The request may be transmitted via any appropriate method, such as an HTTP GET request, a remote procedure call, or any other such method. In some implementations, transmitting the request may comprise opening a transport layer connection to the server. The request may comprise identity information, message extension preferences, and/or additional content preferences as described above.

In an implementation, the push notification system 104 may receive the request for a push notification at step 302. The push notification generator 222 may then generate a push notification responsive to the request in the manner described above. Information related to the content of the push notification may be stored in push notification content storage 228.

In an implementation, the push notification system 104 may transmit the push notification to the client device 102 at step 304. The client device may have been identified by the identity information that was included in the push notification request, for example, by a device token. The push notification can be transmitted to the operating system of the client device in the manner described above, or in any other manner.

In an implementation, at step 306 the push notification system transmits a targeted message creation request to a message creation system 106, as described above. This request may comprise identity information. The identity information may include sufficient information for the message creation system to identify a recipient to whom a targeted message is to be served. For example, the identity information may include a targeted message identifier associated with a push notification identifier that identifies the client device to which a push notification was previously sent. The targeted message identifier may have been associated with the push notification identifier by an application, by an operating system, by an application server, by a push notification system, by the message creation system, or by any other appropriate party, in either of the manners described below in reference to FIGS. 5 and 6, or in any other appropriate manner. For example, an advertising ID may have been associated with a push notification device token by an application server by, e.g., storing data identifying the push notification device token and the advertising ID number as associated in a database. Information related to this association may have been transmitted by the application server to the push notification system, which may in turn have included that information in a request sent to the message creation system to create a targeted message. More detail as to the associating of push notification identity information and targeted message identity information is provided below in reference to FIGS. 5 and 6.

In an implementation, at step 308 the message creation system 106 may receive the targeted message creation request. At step 310, the message creation system 106 may create a targeted message as described above. At this point, the message creation system 106 may store the targeted message in memory pending a request to serve the targeted message to a user of client device 102. In other implementations, including an implementation described below pertaining to FIG. 4B, the targeted message may be served to a user of client device 102 immediately.

In an implementation, the client device 102 may receive the push notification at step 312. The term "receives the push notification" can include the scenario where the client device receives the transmission described in step 304 but where push notifications are disabled for the client device. Additionally or alternatively, push notifications may be disabled for the application 210 associated with the application server 108 that requested the push notification at step 300. The term "receives the push notification" can include the scenario where an attempt is made to serve the push notification is to the client device, but the client device is turned off. For example, the term "receives the push notification" can also include the scenario where the client device is turned off and the push notification transmission is queued on the push notification system for transmission, possibly awaiting a network connection.

In an implementation, the client device 102 determines whether push notifications are disabled, either for the client device 102 in general, or for the application 210, or for both. This determination may be made by attempting to execute the push notification on the client device and receiving a fail response, or by any other method. If push notifications are disabled, proceed to step 316. If they are enabled, proceed to step 326.

In an implementation, at step 316 the client device may transmit information related to the disablement of push notifications to the push notification system 104, and at step 318, this information may be received by the push notification system 104. This information may be processed by a user interaction manager 223, as described above. The information may be passed along to an analysis engine 230 as described above. In an implementation, the analysis engine may determine, based on the message extension preferences stored in message extension preference storage 234, that the targeted message should be served to a user of the client device 102 in this scenario. In this way, a follow-up targeted message may be served to a user when the push notification fails to be displayed to the user.

In an implementation, at step 320 the push notification system 104 may transmit to the message creation system 106 a request to serve a targeted message to a user of a client device. The request to serve may comprise identity information, as described above, such as for example an advertising identifier.

In an implementation, at step 322 the message creation system 106 may receive the request to serve the targeted message to a user of client device 102. A message serving module 240 may then serve the targeted message to a client device and/or application identified by the identity information.

In an implementation in which push notifications were not disabled, at step 326, information related to the push notification enablement may be transmitted to the push notification system 104.

In an implementation, at step 328 the user interaction manager 223 of the push notification system 104 may receive the information related to the push notification enablement. The user interaction manager 223 may forward this information to the analysis engine 230. The analysis engine 230 may then, according to message extension preferences stored in message extension preference storage 234, start a clock. In this implementation, the message extension preferences comprise rules that dictate that if push notifications are enabled on the client device 102 and for the application 210, the targeted message will not be served unless twenty-four (24) hours have elapsed without the push notification being displayed to the user of the client device, counting from the push notification system receives information indicating that push notifications are enabled. Any other message targeting preferences, rules or algorithms may additionally or alternatively be used by the analysis engine 230 in determining whether to transmit a request to serve the created targeted message.

In an implementation, at step 330, the client device 102 may determine whether the push notification has been displayed to a user. This determination may be made by the operating system of the client device, or in any other manner. This step may occur at any time equal to or less than 24 hours after step 326, but preferably occurs at a time in a range of 1-60 seconds after step 326. This allows the process to proceed expediently. If the push notification was not displayed to a user of the client device for any reason, e.g. because the device was turned off, proceed to step 332. If the push notification was displayed to a user of the client device 102, proceed to step 344.

In an implementation, at step 332, the client device 102 may transmit information related to the push notification having not been displayed to a user of the client device to the push notification system 104. At step 334, the user interaction manager 223 may receive this information and forward it to analysis engine 230.

In an implementation, at step 336, the analysis engine may determine whether 24 hours has elapsed since the clock was started at step 328. If 24 hours has elapsed, the analysis engine may determine to transmit a request to message creation system 106 to serve the targeted message to a user of the client device 102 pursuant to the message extension preferences discussed above. At this point, proceed to step 320. If 24 hours has not elapsed, proceed to step 336.

In an implementation, at step 338, the analysis engine may determine to wait for a designated period. This wait period can be useful in that it slows down the process of rechecking to see whether the push notification has yet been displayed to a user. The wait period can be any amount of time less than 24 hours, but is preferably in a range of 5-10 minutes. This strikes an advantageous balance between receiving timely updates, and not straining the resources of either the push notification system 104 or the client device 102 by e.g. repeatedly forcing them to open a network connection to perform the rechecking process a large number of times. The designated period may be a predetermined period determined by the push notification system, or may be determined by the message extension preferences, or may be determined in any other way. In other implementations (not depicted in FIG. 3B), a device may alternatively notify a push notification system via a network when a push message has been viewed, possibly with queuing and retry on the device when there is no network connection, rather than polling a device on a timer to determine whether a message has been viewed.

In an implementation, at step 340, the push notification system 104 may transmit a request to the client device 102 to recheck whether the push notification has been displayed to a user of the client device. The client device 102 may receive this request at step 342. For example, the operating system 208 of the client device may receive this request through a network connection with the push notification system 104. From here, proceed to step 330 to check whether the push notification has been displayed to a user of the client device.

In an implementation in which it is determined at step 330 that the push notification has been displayed to a user, at step 344, the client device 102, or the operating system 208 of the client device, may transmit or cause to be transmitted information related to the push notification having been displayed to a user.

In an implementation, at step 346, the user interaction manager 223 may receive the information related to the push notification having been displayed to a user. This information may be forwarded to the analysis engine 230.

In an implementation, at step 348, the analysis engine 230 may determine, pursuant to the message extension preferences discussed above, to transmit a request to message creation system 106 to end the process of creating and serving the targeted message to a user of the client device 102. This may be done because the push notification was successfully displayed to a user of client device 102, and no follow-up targeted message is desired. The request to end the process may, but need not, include a request to delete the previously created targeted message stored on the message creation system 106.

Figure 4A:
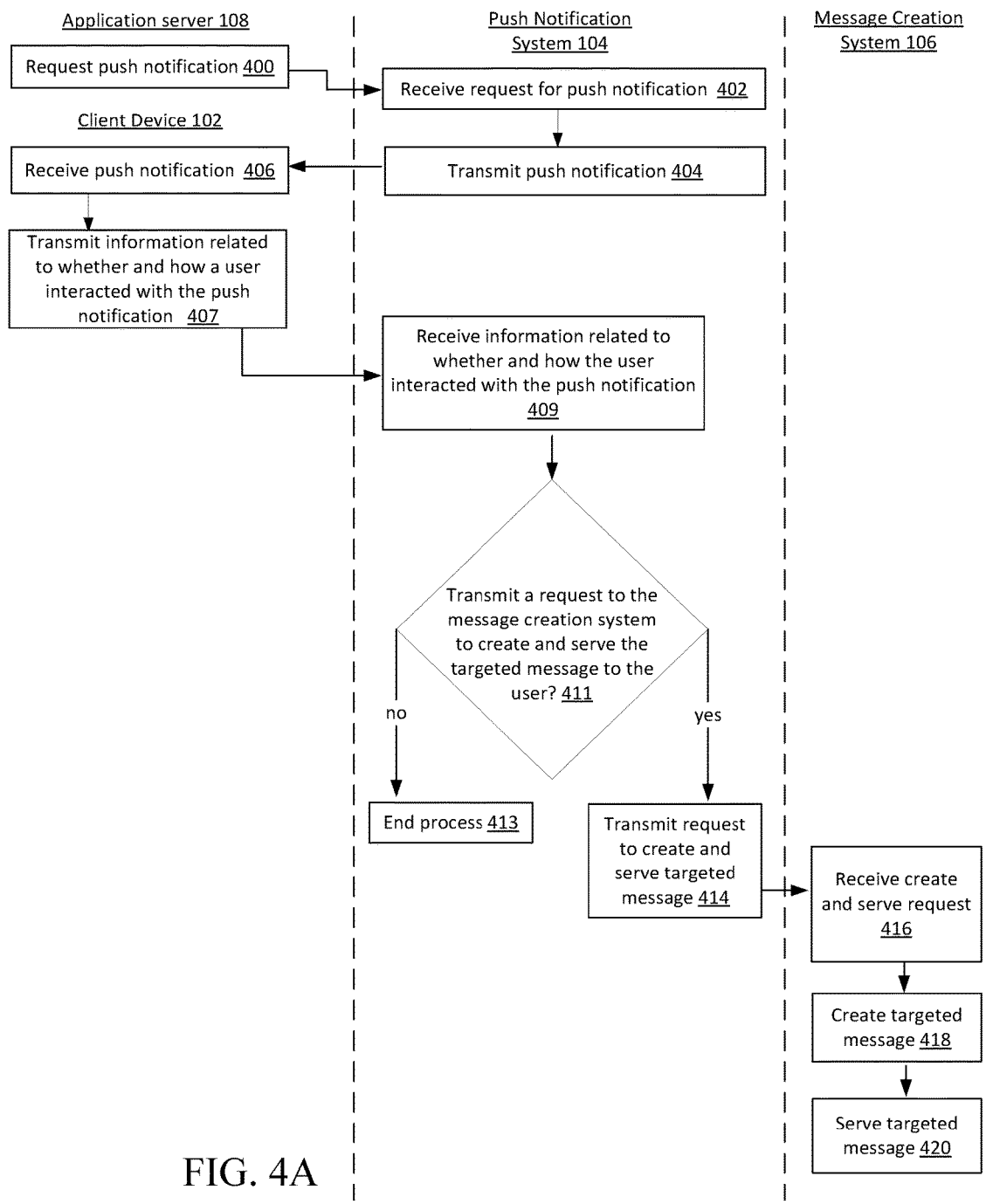
FIG. 4A depicts a general overview of one implementation in which a targeted message is created on-the-spot.
Figure 4B:
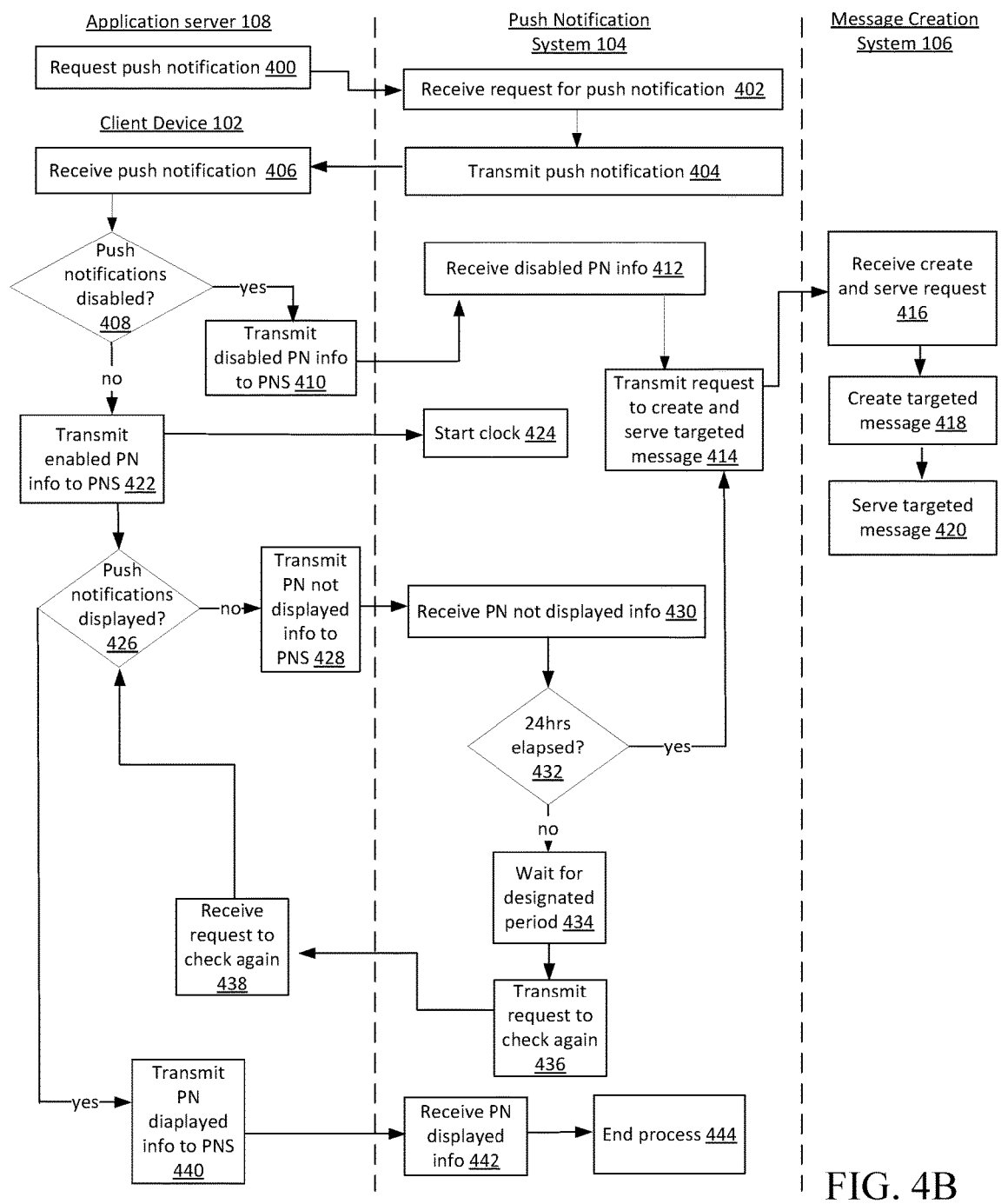
FIG. 4B is a flow chart illustrating a method for automatic extension of information from a first network to a second network involving on-the-spot message creation, according to one implementation.

Referring to FIGS. 4A and 4B in an overview, FIGS. 4A and 4B show another implementation of a method for automatic extension of information from a first network to a second network, similar to the one described above in reference to FIG. 2. FIG. 4A depicts a general overview of one implementation in which a targeted message is created on-the-spot (created and immediately served on the user, rather than created and then stored pending further events, as described above in reference to FIGS. 3A and 3B). FIG. 3B depicts a more specific implementation of such a method, and goes in to more detail.

FIG. 4A depicts a general overview of one implementation in which a targeted message is created on-the-spot. In one implementation, at step 400 an application server 108 may request a push notification, at step 402 a push notification system 104 may receive that request, at step 404 the push notification system may transmit a push notification to a client device 102, and at step 406 the client device 102 may receive the push notification. These steps are similar to steps 300-304 and step 312 shown in FIGS. 3A and 3B, discussed above, and may be performed in a similar manner. However, in the implementation depicted here, the push notification system 104 does not, at this point, transmit a targeted message creation request to message creation system 106.

In one implementation, at step 407, a client device 102 may transmit information related to whether and how a user interacted with the push notification to a push notification system 104, at step 409 a push notification system may receive information related to whether and how a user interacted with the push notification, and at step 411 a push notification system may determine whether to transmit a request to the message creation system to create and serve the targeted message to the user. These steps are similar to steps 313, 315, and 317, described above in reference to FIG. 3A, and may be performed in a similar manner, except that in the implementation described here, at step 411 the push notification system determines whether to transmit a request to create and serve, rather than just serve (as described in reference to step 317), a targeted message.

In one implementation, if the push notification determines not to transmit a request to create and serve the targeted message to the user at step 411, the push notification system may revisit that determination at a later time, possibly when more information is available to it, or it may determine to proceed to step 413 and end the process. For example, if a predetermined amount of time has elapsed since the push notification was transmitted, the push notification system may determine to end the process rather than wait for more information. These determinations may be made in any appropriate manner, such as e.g. those described above or e.g. the manner depicted in FIG. 4B, discussed below.

In an implementation, if the push notification determines to transmit a request to serve the targeted message to the user at step 411, proceed to step 414, where the push notification system may transmit a request to create and serve a targeted message to a user. At step 416, the message creation system 106 may receive this request, and at step 418 the message creation system may create and serve the targeted message to the user. These steps may be performed in any appropriate manner, such as e.g. those described above or e.g. the manner depicted in FIG. 4B, discussed below FIG. 4B shows an implementation similar to one described above in which information is automatically extended from a first network to a second network. However, in this implementation the request to create a targeted message is not triggered by the transmission of the push notification from the push notification system 104 to the client device 102. Rather, the push notification system 104 requests that the message creation system 106 create and serve the targeted message once it is either confirmed that push notifications are disabled on the client device 102 and/or the application 210, or once 24 hours have elapsed after a clock is started at step 424, described below.

In one implementation, at step 400 an application server 108 may request a push notification, at step 402 a push notification system 104 may receive that request, at step 404 the push notification system may transmit a push notification to a client device 102, and at step 406 the client device 102 may receive the push notification. These steps are similar to steps 300-304 and step 312 shown in FIGS. 3A and 3B, discussed above, and may be performed in a similar manner. However, in the implementation depicted in FIG. 4B the push notification system 104 does not, at this point, transmit a targeted message creation request to message creation system 106.

In one implementation, at step 408, the client device 102 may check to see if push notifications are disabled. If they are disabled, proceed to step 410, where the client device 102 may transmit information related to that disabled status to the push notification system 104. At step 412, the push notification system 104 may receive this information. These steps are similar to steps 314-318 shown in FIG. 3B, discussed above, and may be performed in a similar manner.

In one implementation, at step 414, the push notification system 104 may transmit a request to message creation system 106 to create a targeted message and to serve that message to a user of a client device. This differs from the implementations depicted in FIG. 3B, at least because here the targeted message is to be transmitted for serving to a user after it is created, with no further third party instruction needed to trigger that transmission.

In one implementation, at step 416, the message creation system 106 may receive the request to create and serve the targeted message. At step 418, the message creation system 106 may create the targeted message, and at step 420 the message creation system 106 may serve the targeted message to a user of the client device 102. These steps are similar to steps 308, 310, 322, and 324 shown in FIG. 3B, discussed above, and may be performed in a similar manner.

In one implementation, at step 408, if push notifications are not disabled, proceed to step 422. Steps 422-442 are similar to steps 326-344 shown in FIG. 3B, discussed above, and may be performed in a similar manner.

In one implementation, at step 444, the push notification system may end the process. In this example, push notifications were enabled, and a push notification was displayed to a user of client device 102. Thus, there may be no need to serve a follow-up targeted message to the user. In this implementation, unlike any of the implementations of FIG. 3B, a message creation system 106 need not have been involved because no preemptive targeted message was created and stored on the message creation system. This has at least the advantage of conserving the resources of a message creation system 106. However, at steps 418-420, the message creation system 106 may need to both create and serve the targeted message on-the-spot. This may be a longer process than the process of step 324 in FIG. 3B, where the targeted message was already created and needed only to be served. Thus the implementation shown in FIG. 3B may have a shorter process time (counting from the message creation system receiving a request to serve) in those instances where the targeted message is to be served to a user of a client device 102.

Figure 5:
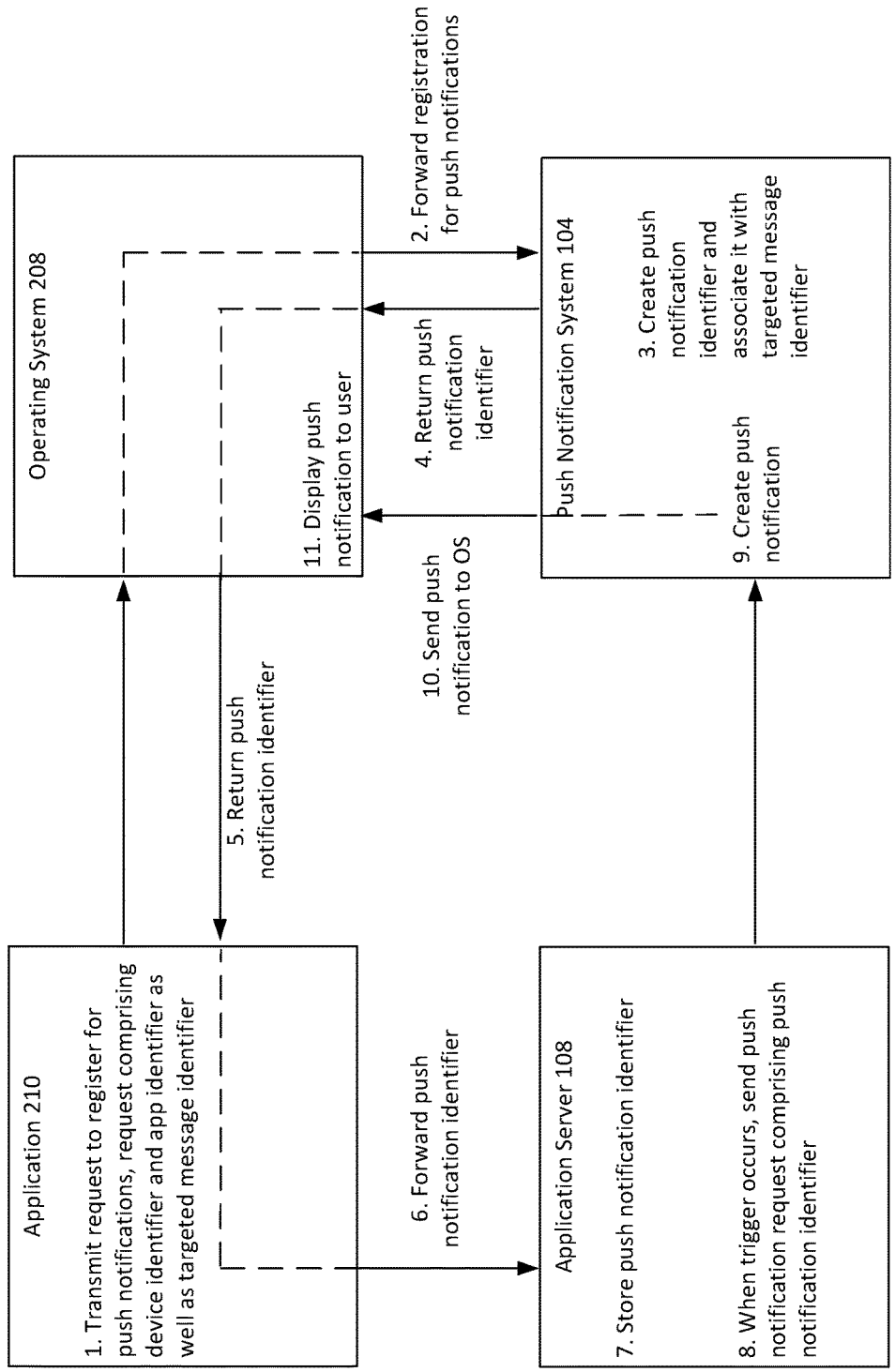
FIG. 5 is a flow chart illustrating a method of associating push notification identity information with targeted message identity information, according to one implementation.
Figure 6:
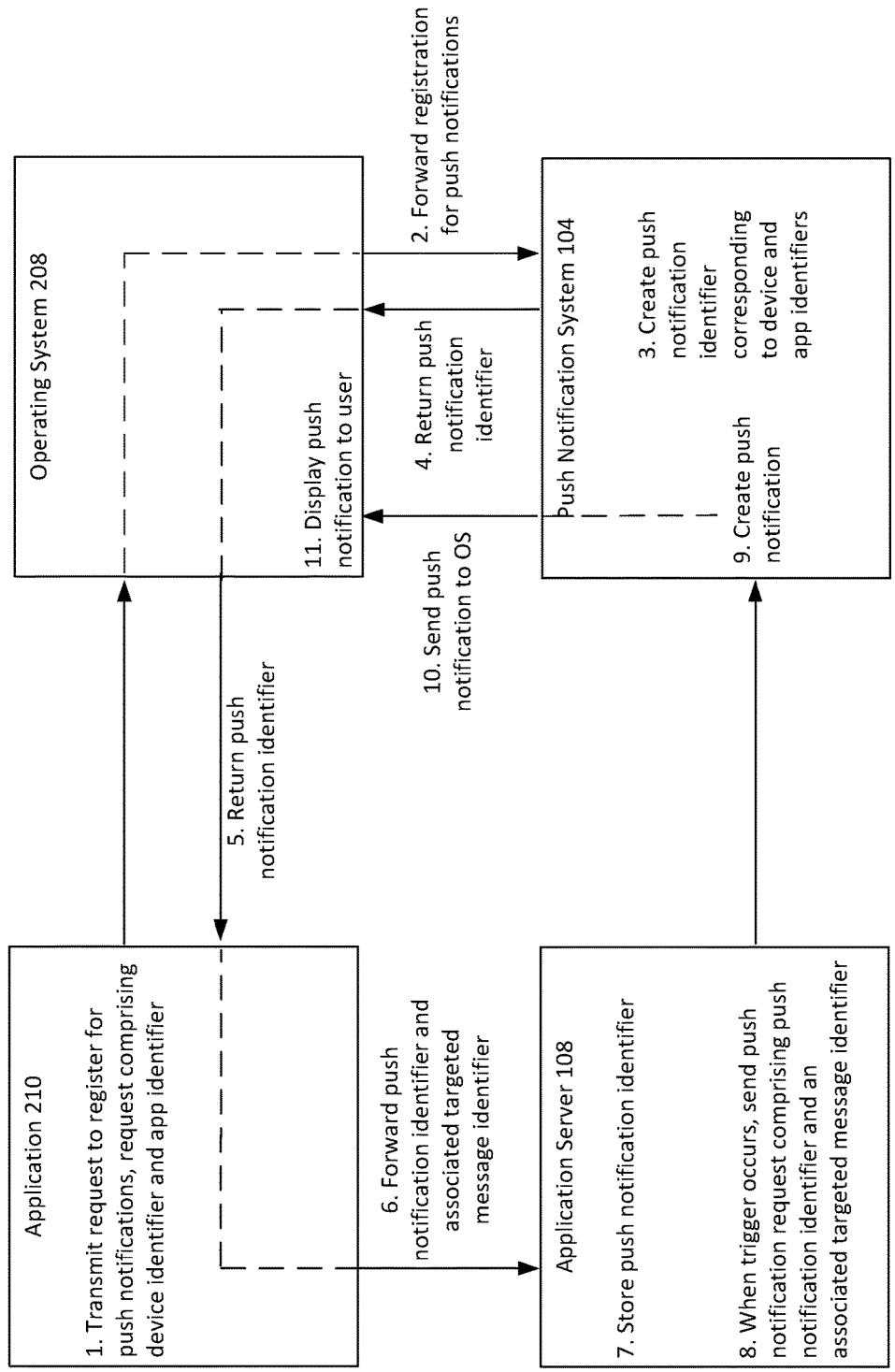
FIG. 6 is a flow chart illustrating another method of associating push notification identity information with targeted message identity information, according to one implementation.

FIGS. 5 and 6 show implementations of a method of automatically extending identity information from one network to another. Often, push notification identifiers and targeted message identifiers are independent of each other and not associated with one another. It is useful to have these two identifiers associated with one another so that a targeted message may be served to the same user to whom a push notification is served. FIG. 5 depicts a process in which a push notification identifier and a targeted message identifier are associated at a time when an application executed on a client device registers for push notifications. FIG. 6 depicts a process in which a push notification identifier and a targeted message identifier are associated at a time when a push notification is requested by an application server.

Referring to FIG. 5, in an implementation at step 1 an application 210 may transmit a registration request to register with a push notification system 104 to obtain a push notification device token. In an implementation, this request may be routed to a push notification system 104 through an operating system 208. In another implementation, an app installed on the client device may execute code that uses a $3^{rd}$ party messaging application program interface ("API") to transmit the request over a network. For example, the app might execute code that uses a services layer running on the device to transmit the request to a push notification system. The request may comprise push notification identity information that includes a device identifier identifying the client device 102 and an app identifier identifying application 210. The registration request may also comprise targeted message identity information that is related to the push notification identity information in that it identifies the same device, the same application, or a combination of the two. The targeted message identity information may be included in the request by, e.g., the operating system of the device or my a services layer running on the device.

In an implementation, the relationship between the push notification identity information and the targeted message identity information may be in any appropriate manner such that, at a later point in an implementation of any of the processes described above in reference to FIG. 2, 3A, 3B, 4A, or 4B, a targeted message may be served to the same user to whom a push notification is was previously served. For example, in an implementation, an advertising ID may be associated with push notification identity information, e.g. a device identifier identifying the client device 102 and an app identifier identifying application 210. In an implementation of step 1 of the process depicted in FIG. 5, the transmitted push notification registration request may comprise the associated advertising ID.

In an implementation, at step 2 an operating system 208 of a client device 102 on which an application 210 is executed may forward a registration request received by the application to a push notification system 104 to register for push notifications.

In an implementation, at step 3 a push notification system 104 may create a push notification identifier, e.g. a device token, for the application 210, based on e.g. a device identifier identifying the client device 102 and an app identifier identifying application 210 received in a registration request. The push notification system 104 may associate the newly created push notification token with a targeted message identifier that it may have received as part of the registration request or that it may have gathered itself directly from the device and that was associated with the push notification identity information. The push notification system may create a push notification device token based on the received device identifier and app identifier, and may associate the received advertising ID with the newly created push notification token. The push notification system 104 may store a list of corresponding push notification device token-targeted message identifier pairs, which can later be used in a process of serving a follow-up targeted message to a user after an attempt is made to serve the user with a push notification.

In an implementation, at step 4 the push notification system may transmit the push notification identifier, e.g. a push notification device token, or a copy of the push notification identifier, to the operating system 208. At step 5, the operating system, or e.g. a services layer, may return or forward the push notification identifier to the application 210.

In an implementation, at step 6, the application 210 may forward the push notification identifier to an application server 108, and at step 7 the application server may store the push notification identifier. This can help a party managing the various instances of the application that may be installed on various client devices, e.g. a party managing application 210 and possibly other installed applications, to maintain a list of push notification identifiers for use in e.g. requesting that push notifications be sent a specific set of installed applications. For example, a manager of a shopping application may use such a list to request push notifications from a push notification system to inform a set of users of the applications identified by the list that an item is currently on sale.

In an implementation, at step 8, when a triggering event occurs, such as, e.g., the sale event described above, the application server may transmit a push notification request to the push notification server. The request may comprise a push notification identifier that identifies application 210 installed on client device 102, e.g. a push notification device token. In other implementations, a triggering event may be a user of an application being in a particular geographic location, e.g. as described above, or may be any other triggering event. In other implementations, push notification requests need not be triggered automatically, and may alternatively or additionally be sent on demand by e.g. an application manager.

In an implementation, at step 9 a push notification system 104 may, upon receiving a push notification request, create a push notification as described above in reference to FIG. 2. At step 10, the push notification server may transmit the push notification to an operating system 208 identified by a push notification token received e.g. as part of the push notification request. At step 11, the operating system may execute a code, or a program, or an application to cause the push notification to be displayed to a user of the client device as described above.

In an implementation, after step 11, a push notification has been served or an attempt has been made to serve a user of an application executed on a client device by a push notification system, the application and/or device having been identified by a push notification identifier. The push notification system has also stored information that associates the push notification identifier with a targeted message identifier, which can later be used to serve a follow-up targeted message to the user in e.g. any of the manners described in this application. This implementation demonstrates one manner in which a push notification identifier and a targeted message identifier may be associated for purposes of serving a follow-up targeted message to a user of an application after service of a push notification.

FIG. 6 depicts a process in which a push notification identifier and a targeted message identifier are associated at a time when a push notification is requested by an application server. In an implementation, a manager of the application server 108 may ensure that the two identifiers are correctly associated. A difference between the implementation shown in FIG. 6 and that shown in FIG. 5 is that the push notification registration request transmitted by an application does not comprise a targeted message identifier when it begins a registration process for push notifications. Rather, in an implementation, the application 210 may transmit an associated targeted message identifier along with a push notification identifier to an application server 108 at step 6, and the application server may forward both identifiers to the push notification system at step 8. This has the advantage of providing to the push notification system associated targeted message identifiers on an as-needed basis, e.g. when a push notification is requested and a follow-up targeted message is desired, rather than providing associated targeted message identifiers to the push notification system in advance of any certain need for follow-up targeted messages. A disadvantage of this method relative to e.g. an implementation of the method described in FIG. 5 is that a manager of an application server must associate targeted message identifiers themselves and maintain a database of such associations, rather than having a push notification server maintain such a database. All other steps, and the associating of the push notification identifier with the targeted message identifier, may be performed in manners similar to those described above in reference to FIG. 5, or in any other appropriate manner.

Although an implementation of a system 100 and implementations of various methods have been described above, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method for automatic extension of information from a first network to a second network comprising:
   receiving, by a push notification system from an application server, a request to serve to a client device a push notification, the request comprising push notification identity information;
   transmitting, by the push notification system to the client device in response to the received request, a push notification;
   transmitting, by the push notification system to a message system, a targeted message request comprising information related to the content of the transmitted push notification and targeted message identity information associated with the push notification identity information;
   retrieving, by the message system responsive to the request, a targeted message, wherein at least some content of the targeted message is based on the information related to the content of the transmitted push notification, the message targeted based on the targeted message identity information,
   receiving, by the push notification system from an operating system of the client device, information related to whether and how a user of the client device interacted with the push notification;
   determining, by the push notification system, based at least in part on the information related to whether and how the user of the client device interacted with the push notification, to transmit a request to the message system to serve the targeted message using the targeted message identity information; and
   transmitting, by the push notification system to the message system responsive to the determination, the request to serve the targeted message using the targeted message identity information.

2. The method of claim 1, wherein the request to serve to the client device the push notification further comprises one or more message extension preferences, and wherein determining whether to transmit the request to the message system to serve the targeted message based on the targeted message identity information is based at least in part on the one or more message extension preferences.

3. The method of claim 1, wherein one or more message extension preferences are received by the push notification system via a user interface, and wherein determining whether to transmit a request to the message system to serve the targeted message based on the targeted message identity information is based at least in part on the one or more message extension preferences.

4. The method of claim 1, wherein the push notification identity information comprises a push notification device token and wherein the targeted message identity information comprises an advertising identifier.

5. The method of claim 1, wherein the push notification identity information is associated with the targeted message identity information by the push notification system.

6. The method of claim 1, wherein the push notification identity information is associated with the targeted message identity information by an application executed by the client device.

7. The method of claim 1, wherein the push notification identity information is associated with the targeted message identity information by the operating system of the client device.

8. The method of claim 1, wherein the push notification identity information is associated with the targeted message identity information by the application server.

9. The method of claim 1,
wherein the request to serve to the user the push notification further comprises additional content preferences;
wherein the targeted message request further comprises additional content information based on the additional content preferences; and
wherein at least some of the content of the targeted message is based on the additional content information.

10. A method for automatic extension of information from a first network to a second network comprising:
receiving, by a push notification system from an application server, a request to serve to a client device a push notification, the request comprising push notification identity information;
transmitting, by the push notification system to the client device in response to the received request, a push notification;
receiving, by the push notification system from an operating system of the client device, information related to whether and how a user of the client device interacted with the push notification;
determining, by the push notification system, based at least in part on the information related to whether and how the user interacted with the push notification, whether to transmit a request to a message system to retrieve and serve a targeted message;
transmitting, by the push notification system to the message system responsive to the determination, a targeted message retrieve and serve request comprising information related to the content of the transmitted push notification and targeted message identity information associated with the push notification identity information;
retrieving, by the message system responsive to the retrieve and serve request, a targeted message, wherein at least some content of the targeted message is based on the information related to the content of the transmitted push notification, the message targeted based on the targeted message identity information; and
serving, by the message system, the targeted message based on the targeted message identity information.

11. The method of claim 10, wherein the request to serve to the client device a push notification further comprises one or more message extension preferences, and wherein the determining whether to transmit the request to the message system to retrieve and serve the targeted message is based at least in part on the one or more message extension preferences.

12. The method of claim 10, wherein one or more message extension preferences are received by the push notification system via a user interface, and wherein determining whether to transmit the request to the message system to serve the targeted message is based at least in part on the message extension preferences.

13. The method of claim 10, wherein the push notification identity information comprises a push notification device token and wherein the targeted message identity information comprises an advertising identifier.

14. The method of claim 10, wherein the push notification identity information is associated with the targeted message identity information by the push notification system.

15. The method of claim 10, wherein the push notification identity information is associated with the targeted message identity information by an application executed by the client device.

16. The method of claim 10, wherein the push notification identity information is associated with the targeted message identity information by the operating system of the client device.

17. The method of claim 10, wherein the push notification identity information is associated with the targeted message identity information by the application server.

18. The method of claim 11,
wherein the request to serve to the client device the push notification further comprises additional content preferences;
wherein the targeted message retrieve and serve request further comprises additional content information based on the additional content preferences; and
wherein at least some of the content of the targeted message is based on the additional content information.

19. The method of claim 1, wherein transmitting the targeted message request and retrieving the targeted message are performed subsequent to determining, by the push notification system, whether to transmit the request to the message system to serve the targeted message.

* * * * *